(No Model.)
G. W. SNYDER.
SPROCKET WHEEL.
No. 550,334. Patented Nov. 26, 1895.
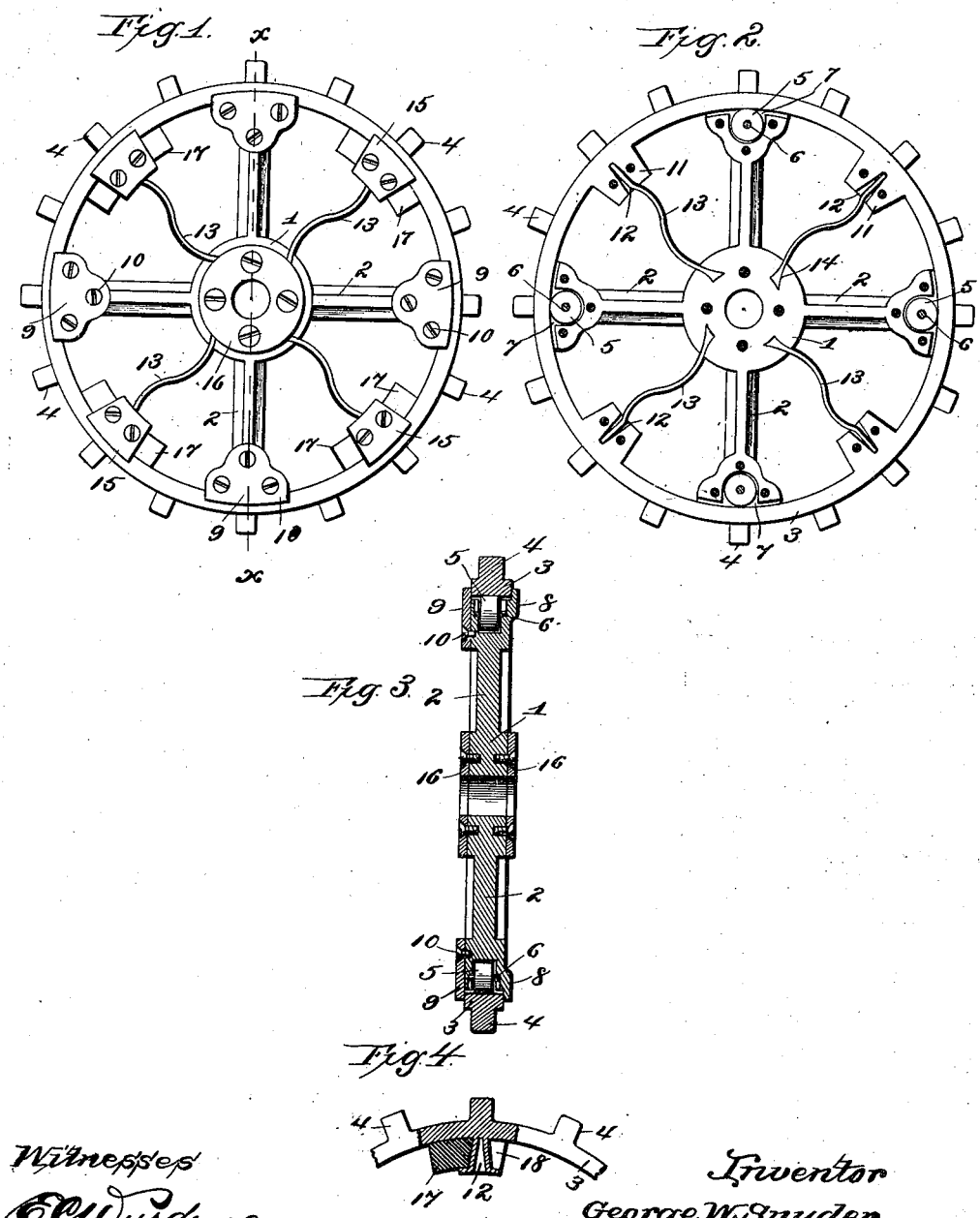
Witnesses
E. C. Wurdeman
S. A. Williamson
Inventor
George W. Snyder
by Geo. H. Holgate
Attorney

UNITED STATES PATENT OFFICE.

GEORGE W. SNYDER, OF PHILADELPHIA, PENNSYLVANIA.

SPROCKET-WHEEL.

SPECIFICATION forming part of Letters Patent No. 550,334, dated November 26, 1895.

Application filed August 8, 1895. Serial No. 558,639. (No model.)

*To all whom it may concern:*

Be it known that I, GEORGE W. SNYDER, a citizen of the United States, residing at Philadelphia, in the county of Philadelphia and State of Pennsylvania, have invented certain new and useful Improvements in Bicycle Sprocket-Wheels, of which the following is a full, clear, and exact specification.

My invention relates to a new and useful improvement in sprocket-wheels for bicycles, and has for its object to provide such a device that will have a spring or elastic action between the crank-shaft and the drive-chain.

With these ends in view the invention consists in the details of construction and combination of elements hereinafter set forth and then specifically designated by the claims.

In order that those skilled in the art to which my invention appertains may understand how to make and use the same, I will describe its construction and operation in detail, referring by number to the accompanying drawings, forming a part of this specification, in which—

Figure 1 is a side elevation of my improved sprocket-wheel; Fig. 2, a similar view with the caps removed, showing the roller and spring bearings; Fig. 3, a section at the line *x x*, and Fig. 4 a detail broken-away view showing the manner of securing the rubber cushions or buffers to the rim of the wheel.

Similar numbers denote like parts in all the views of the drawings.

1 represents a hub, having formed therewith the spokes 2, and 3 is a rim provided with the toe 4, adapted to engage the links of an ordinary sprocket-chain, and this rim is held in its concentric position with the hub by the rolls 5, pivoted at 6 in sockets 7, formed in the outer ends of the spokes.

8 are flanges formed with the outer ends of the spokes and in conjunction with the caps 9, secured by screws 10 to the spokes, form guides for the rim, whereby said rim is prevented from lateral movement.

11 are lugs projecting from the inner face of the rim and provided with bearings 12, in which fit the outer ends of the springs 13, and these springs are secured at their inner ends to the hub at 14. The caps 15 and disks 16 retain said springs in their proper positions.

From this description it will be seen that when motion is imparted to the hub which is adapted to be secured upon the crank-shaft of a bicycle, said motion will be transmitted to the rim through the springs 13, which will give more or less, in proportion as strain is exerted between said hub and rim, the rollers acting as guides to permit the free movement of the rim independent of the hub, and, as seen, the springs are of such shape as to accommodate themselves to this movement.

The great advantage of a sprocket built in accordance with my improvement is that when applied to a bicycle the rider may accumulate a limited amount of force in the springs by forcing the crank-shaft ahead of the movement of the rim, and this accumulated force will enable the machine to pass over obstructions with greater ease than would otherwise be the case.

In racing it is desirable to start as quickly and with as much reserve force as is possible, in order to overcome the inertia of the rider and machine, and this is accomplished by the use of my improved sprocket, since while the machine is at rest the rider may accumulate all the power that the springs are capable of absorbing and hold them in tension, so that upon the signal being given to start and the machine being released he not only has his own power to exert upon the machine, but that which is static in the springs.

A further advantage of my improvement is that in riding over rough and uneven roads the wear and tear upon the machine and strain upon the rider incident to the jar transmitted from the drive-wheel to the crank-shaft is obviated, since said jar is taken up by the springs.

To prevent the ends of the sprockets from coming in violent contact with the lugs 11, I provide elastic buffers 17, adapted to be secured in the cavities 18, formed in the lugs, and by this means a further reduction of the jar between the hub and rim is accomplished.

I am aware that slight modifications might be made in the formation and arrangement of parts shown and described without departing from the spirit of my invention, which rests in the broad idea of forming the hub and spokes of a sprocket separate from the rim and uniting them by springs or their equivalent, and I therefore do not wish to be limited to the exact construction shown and described.

Having thus fully described my invention, what I claim as new and useful is—

1. A sprocket wheel, consisting of a hub adapted to be secured to the crank shaft of a bicycle, spokes formed with said hub, rolls journaled in the outer ends of said spokes, a toothed rim guided by said rolls and spokes, and springs secured to said hub and adapted to bear against said rim whereby motion is transmitted from said hub to said rim, as shown and described.

2. In a bicycle sprocket, the combination of the hub 1, spokes 2, formed therewith, rolls 5, journaled in the outer ends of said spokes, rim 3, guided by said spokes and rolls and springs 13, secured to the hub and rim, whereby motion is transmitted from the former to the latter, substantially as shown and described.

3. In a bicycle sprocket, the combination of the hub 1, spokes 2, provided with sockets at their outer ends, rolls journaled within said sockets, rim 3, adapted to bear and be guided by said rolls, flanges 8, and caps 9, adapted to prevent lateral movement of said rim, and springs 13, secured to the hub, having their outer ends projecting into openings formed in lugs cast with said rim, as shown and described.

In testimony whereof I have hereunto affixed my signature in the presence of two subscribing witnesses.

GEORGE W. SNYDER.

Witnesses:
S. F. WILLIAMSON,
JAMES LEWIS.